E. G. DODGE.
PRIMARY BATTERY.
APPLICATION FILED JUNE 12, 1909.

969,349.

Patented Sept. 6, 1910.

Witnesses:

Inventor:
Eben G. Dodge
by Frank L. Dyer
Atty.

UNITED STATES PATENT OFFICE.

EBEN G. DODGE, OF MAPLEWOOD, NEW JERSEY, ASSIGNOR TO EDISON MANUFACTURING COMPANY, OF WEST ORANGE, NEW JERSEY, A CORPORATION OF NEW JERSEY.

PRIMARY BATTERY.

969,349.  Specification of Letters Patent.  Patented Sept. 6, 1910.

Application filed June 12, 1909. Serial No. 501,821.

*To all whom it may concern:*

Be it known that I, EBEN G. DODGE, a citizen of the United States, and a resident of Maplewood, Essex county, New Jersey, have made a certain new and useful Invention in Primary Batteries, of which the following is a description.

My invention relates to improvements in primary or voltage batteries of that class in which the negative electrode consists in a plate of oxid of copper or other depolarizing agent properly molded and agglomerated, and the positive electrode consists of a plate or plates of zinc.

My invention is an improvement on that described in my Patent No. 894,487 for primary batteries, granted July 28, 1908, and the object of my invention is to simplify, cheapen and render more efficient the construction of batteries of the above described class.

My invention is particularly directed to the provision of means for securing together positive and negative electrode plates and insulating means, said positive plate being so formed as to protect the part thereof contacted by the securing means against electrolytic action.

My invention consists further in the details of construction and combinations of parts hereinafter more particularly described and claimed.

Figure 1:
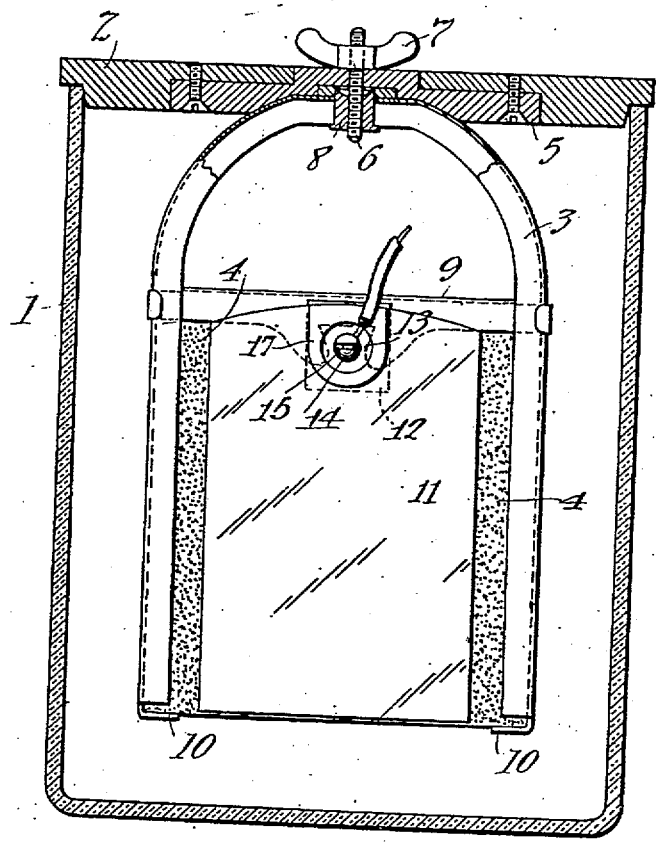
Figure 2:
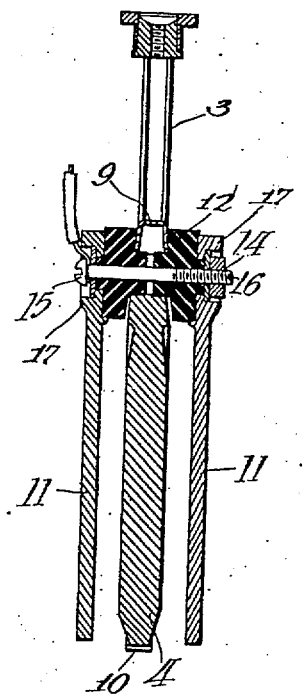

In the accompanying drawings forming part of this specification, Figure 1 illustrates a vertical section through a battery embodying my invention, shown partly in section and partly in side elevation. Fig. 2 is a transverse vertical section through the same.

Referring to the drawings, 1 indicates an ordinary containing jar preferably of porcelain and provided with the usual cover 2 also preferably of porcelain.

The numeral 3 indicates a frame or hanger preferably constructed of a strip of sheet copper or copper plated iron, the edges of said strip being turned up to such an extent as to lie flat against the bevel edges of the negative electrode plate 4. The whole hanger 3 is preferably given the form of an inverted U, the two arms of which hold the edges of the negative plate 4. The upper portion of the frame or hanger 3 is supported by the cover 2 of the battery in any convenient manner, as by means of the plate 5 which is countersunk in the cover 2, the hanger 3 being supported from said plate 5 by means of the screw 6 and butterfly nut 7, the hanger 3 being provided with a suitable bearing 8 on the outer portion of the yoke thereof for the screw 6. The cross piece 9 is provided as indicated, being mounted upon the top of the negative plate 4 and secured to the two arms of the hanger 3. The bottoms of the arms of the hanger 3 are bent inwardly as shown at 10 to form a bottom support for the plate 4.

The positive plates 11 which are preferably of zinc as stated are secured in proper relation to the negative plate 4 by means of the bolt 14 and insulator 12. The insulator 12 of any suitable material is inserted through the opening 13 in the cross piece 9, the sides of this opening being tapered, as shown, and the bolt 14 passes through the center of the insulator 12. The bolt 14 is provided with a head 15 and with nut 16, the head, nut, and suitable washers being mounted in recesses countersunk on the outer surfaces of positive plates 11. These countersunk recesses are surrounded by an annular boss 17, the washers on the ends of the bolt being snugly seated within their respective recesses. The bolt 14, head 15, nut 16 and the washers are preferably of copperplated iron or of copper and amalgamated to reduce the difference of potential between the zinc plates and the same, as is well known.

The provision of the countersunk recesses and the annular bosses 17 is the chief feature of my invention, whereby during the electrolytic action of the cell, the mounting of the bolt 14 and its co-acting parts binding firmly together the various plates of the cell, is protected. The provision of the recesses and shoulders 17 prevents the eating away of the plates 11 around and under the washers and the nut and head of the bolt 14, the shoulders 17 having first to be consumed by the electrolyte before the surfaces underneath the washers can be attacked. If it were not for the provision of this means, the plates 11 would be eaten away underneath the washers whereby the parts could no longer be securely fastened together, and the resistance of the cell would be largely increased.

Having now described my invention, what I claim and desire to protect by Letters Patent is as follows:

1. In a voltaic battery, the combination of a negative electrode plate, a positive electrode plate, insulating means separating said plates, means securing said parts together, said positive plate being so formed as to protect the part thereof contacted by said securing means against electrolytic action, substantially as described.

2. In a voltaic battery the combination of a negative electrode plate, a positive electrode plate, insulating means separating said plates, a bolt securing said parts together, said bolt having holding means thereon contacting the outer surface of said positive plate, and said plate being formed with a boss surrounding said holding means, substantially as described.

3. In a voltaic battery, the combination of a negative electrode plate, a pair of positive electrode plates, one on each side of said negative plate, insulators separating said plates, and a bolt extending through said insulators and positive plates and clamping the same together and provided with a nut, said positive plates having countersunk recesses for the reception of the head and nut of the bolt, and annular bosses surrounding said recesses, substantially as described.

4. In a voltaic battery, the combination with a copper oxid plate of a hanger having depending arms supporting said plate, a cross piece connecting the arms of said hanger, a pair of zinc plates supported by said cross piece, insulating blocks between said zinc plates and said cross piece, and a bolt passing through said insulating blocks and connecting said zinc plates, each zinc plate being formed with an annular boss on its exterior surface surrounding the adjacent end of said bolt, substantially as described.

This specification signed and witnessed this 9th day of June 1909.

EBEN G. DODGE.

Witnesses:
DYER SMITH,
JOHN M. CANFIELD.

---

Correction in Letters Patent No. 969,349.

It is hereby certified that in Letters Patent No. 969,349, granted September 6, 1910, upon the application of Eben G. Dodge, of Maplewood, New Jersey, for an improvement in "Primary Batteries," an error appears in the printed specification requiring correction as follows: Page 1, line 9, the word "voltage" should read *voltaic;* and that the said Letters Patent should be read with this correction therein that the same may conform to the record of the case in the Patent Office.

Signed and sealed this 27th day of September, A. D., 1910.

[SEAL.]

C. C. BILLINGS,
*Acting Commissioner of Patents.*

Having now described my invention, what I claim and desire to protect by Letters Patent is as follows:

1. In a voltaic battery, the combination of a negative electrode plate, a positive electrode plate, insulating means separating said plates, means securing said parts together, said positive plate being so formed as to protect the part thereof contacted by said securing means against electrolytic action, substantially as described.

2. In a voltaic battery the combination of a negative electrode plate, a positive electrode plate, insulating means separating said plates, a bolt securing said parts together, said bolt having holding means thereon contacting the outer surface of said positive plate, and said plate being formed with a boss surrounding said holding means, substantially as described.

3. In a voltaic battery, the combination of a negative electrode plate, a pair of positive electrode plates, one on each side of said negative plate, insulators separating said plates, and a bolt extending through said insulators and positive plates and clamping the same together and provided with a nut, said positive plates having countersunk recesses for the reception of the head and nut of the bolt, and annular bosses surrounding said recesses, substantially as described.

4. In a voltaic battery, the combination with a copper oxid plate of a hanger having depending arms supporting said plate, a cross piece connecting the arms of said hanger, a pair of zinc plates supported by said cross piece, insulating blocks between said zinc plates and said cross piece, and a bolt passing through said insulating blocks and connecting said zinc plates, each zinc plate being formed with an annular boss on its exterior surface surrounding the adjacent end of said bolt, substantially as described.

This specification signed and witnessed this 9th day of June 1909.

EBEN G. DODGE.

Witnesses:
DYER SMITH,
JOHN M. CANFIELD.

---

Correction in Letters Patent No. 969,349.

It is hereby certified that in Letters Patent No. 969,349, granted September 6, 1910, upon the application of Eben G. Dodge, of Maplewood, New Jersey, for an improvement in "Primary Batteries," an error appears in the printed specification requiring correction as follows: Page 1, line 9, the word "voltage" should read *voltaic;* and that the said Letters Patent should be read with this correction therein that the same may conform to the record of the case in the Patent Office.

Signed and sealed this 27th day of September, A. D., 1910.

[SEAL.]

C. C. BILLINGS,
*Acting Commissioner of Patents.*

It is hereby certified that in Letters Patent No. 969,349, granted September 6, 1910, upon the application of Eben G. Dodge, of Maplewood, New Jersey, for an improvement in "Primary Batteries," an error appears in the printed specification requiring correction as follows: Page 1, line 9, the word "voltage" should read *voltaic;* and that the said Letters Patent should be read with this correction therein that the same may conform to the record of the case in the Patent Office.

Signed and sealed this 27th day of September, A. D., 1910.

[SEAL.]

C. C. BILLINGS,
*Acting Commissioner of Patents.*